US011477711B2

(12) United States Patent
Dhanapal et al.

(10) Patent No.: US 11,477,711 B2
(45) Date of Patent: Oct. 18, 2022

(54) SIGNALING REDUCTION FOR INTER-RADIO ACCESS TECHNOLOGY TRANSITIONS

(71) Applicant: Apple Inc., Cupertino, CA (US)

(72) Inventors: Muthukumaran Dhanapal, Dublin, CA (US); Murtaza A. Shikari, Mountain View, CA (US); Pankaj Subhash Vasandani, Cupertino, CA (US); Sai Sravan Bharadwaj Karri, Morgan Hill, CA (US); Srinivasan Nimmala, San Jose, CA (US); Srirang A. Lovlekar, Cupertino, CA (US); Vijay Venkataraman, San Jose, CA (US)

(73) Assignee: Apple Inc.

( * ) Notice: Subject to any disclaimer, the term of this patent is extended or adjusted under 35 U.S.C. 154(b) by 0 days.

(21) Appl. No.: 16/796,453

(22) Filed: Feb. 20, 2020

(65) Prior Publication Data

US 2021/0266803 A1  Aug. 26, 2021

(51) Int. Cl.
  *H04W 36/00* (2009.01)
  *H04W 36/14* (2009.01)
  *H04W 88/06* (2009.01)

(52) U.S. Cl.
  CPC . *H04W 36/00837* (2018.08); *H04W 36/0094* (2013.01); *H04W 36/14* (2013.01); *H04W 88/06* (2013.01)

(58) Field of Classification Search
  CPC . H04W 36/0079; H04W 36/08; H04W 36/18; H04W 36/30; H04W 36/20; H04W 36/385; H04W 36/0022
  See application file for complete search history.

(56) References Cited

U.S. PATENT DOCUMENTS

| | | | |
|---|---|---|---|
| 2010/0216469 A1* | 8/2010 | Yi | H04W 48/20 455/435.3 |
| 2011/0021158 A1* | 1/2011 | Xing | H04W 36/30 455/68 |
| 2015/0173119 A1* | 6/2015 | Wirtanen | H04W 52/0229 455/452.1 |
| 2015/0208267 A1* | 7/2015 | Jung | H04W 64/00 455/456.1 |
| 2017/0295523 A1* | 10/2017 | Cho | H04W 36/0077 |
| 2017/0318502 A1* | 11/2017 | Singh | H04W 36/0022 |
| 2018/0109987 A1* | 4/2018 | Xu | H04W 36/04 |
| 2018/0332428 A1* | 11/2018 | Gupta | H04L 61/1564 |
| 2019/0281647 A1* | 9/2019 | Chiang | H04W 36/0022 |
| 2019/0387440 A1* | 12/2019 | Yiu | H04W 36/165 |
| 2020/0007200 A1* | 1/2020 | Schreck | H04B 7/0617 |

* cited by examiner

*Primary Examiner* — Shantell L Heiber
(74) *Attorney, Agent, or Firm* — Fay Kaplun & Marcin, LLP (57) ABSTRACT

The exemplary embodiments relate to inter-radio access technology (iRAT) signaling reduction for a user equipment (UE). The UE may identify an inter-radio access technology (iRAT) event and determine that a predetermined condition is satisfied. The predetermined condition may be based on identifying a predetermined number of iRAT events within a predetermined time window. The UE may then implement a mechanism for iRAT signaling reduction based on the predetermined condition.

22 Claims, 3 Drawing Sheets

SIGNALING REDUCTION FOR INTER-RADIO ACCESS TECHNOLOGY TRANSITIONS

BACKGROUND

A user equipment (UE) may establish a connection to at least one of multiple different networks or types of networks. To establish the connection and perform the full scope of functionalities normally available to the US via the network connection, the UE may camp on a base station of a corresponding network. When camped, network access may be facilitated via one of multiple different types of radio access technologies (RATs).

The UE may be located within an environment that includes multiple networks, each corresponding to a different RAT and deployed with an overlapping coverage area. For example, a Long Term Evolution (LTE) network may have a coverage area that overlaps with a legacy network such as a Wideband Code Division Multiple Access (WCDMA) network. During operation, the UE may be triggered to switch from being camped on a cell corresponding a particular RAT to being camped on another cell corresponding to a different RAT. This switch may be referred to as an inter-RAT transition.

Under conventional circumstances, for any of a variety of different reasons, multiple iRAT transitions may be triggered within a short time window (e.g., 30 seconds, 1 minute, 3 minutes, 6 minutes, 15 minutes, 30 minutes, 1 hour, 2 hours, etc.). For each iRAT transition, the UE may perform various operations and participate in various signaling exchanges. When the UE is subject to excessive iRAT transitions, repeating the operations and signaling exchanges for each iRAT transition causes a power drain on the UE's limited power supply.

SUMMARY

According to some exemplary embodiments a method is performed at a user equipment (UE). The method includes identifying an inter-radio access technology (iRAT) event and determining that a first predetermined condition is satisfied. The first predetermined condition is based on identifying a predetermined number of iRAT events within a predetermined time window. The method further includes implementing a first mechanism for iRAT signaling reduction based on the first predetermined condition.

Further exemplary embodiments include a user equipment (UE) that has a transceiver and a processor. The transceiver is configured to communicate with multiple types of networks. The processor is configured to perform operations that include identifying an inter-radio access technology (iRAT) event and determining that a first predetermined condition is satisfied. The first predetermined condition is based on identifying a predetermined number of iRAT events within a predetermined time window. The operations further include implementing a first mechanism for iRAT signaling reduction based on the first predetermined condition.

In still further exemplary embodiments, an integrated circuit is provided. The integrated circuit includes circuitry configured to identify an inter-radio access technology (iRAT) event and circuitry configured to determine that a first predetermined condition is satisfied. The first predetermined condition is based on identifying a predetermined number of iRAT events within a predetermined time window. The integrated circuit further includes circuitry configured to implement a first mechanism for iRAT signaling reduction based on the first predetermined condition.

DETAILED DESCRIPTION

The exemplary embodiments may be further understood with reference to the following description and the related appended drawings, wherein like elements are provided with the same reference numerals. The exemplary embodiments relate to inter-radio access technology (iRAT) signaling reduction for a user equipment (UE). The exemplary embodiments mitigate the performance degradation and power drain associated with excessive iRAT transitions.

The exemplary embodiments are described with regard to a UE. Any reference to a UE is merely for illustrative purposes. The exemplary embodiments may be utilized with any electronic component that may establish a connection with a network and is configured with the hardware, software and/or firmware to exchange information and data with the network. Therefore, the UE as described herein is used to represent any electronic component.

The exemplary embodiments are also described with regard to multiple types of RATs. For example, reference may be made to fifth generation (5G) networks such as New Radio (NR), fourth generation (4G) networks such as Long Term Evolution (LTE), wireless local area networks (WLANs) and legacy networks such as the third generation (3G) Wideband Code Division Multiple Access (WCDMA) network and the second generation (2G) Global System for Mobile Communications (GSM) network. Throughout this description, any reference to a particular RAT is merely provided for illustrative purposes, those skilled in the art will understand that the exemplary embodiments may apply to any appropriate RAT.

The exemplary embodiments are further described with regard to an iRAT transition. Throughout this description, the term "iRAT transition" may refer to any procedure in which the UE switches from being camped on a cell corresponding to a first RAT to being camped on another cell corresponding to a different second RAT. To provide a general example, an iRAT transition may occur when the UE is subject to a handover, a cell selection procedure or a cell reselection procedure that causes the UE to switch from being camped on a cell corresponding to a first RAT to being camped on a cell corresponding to a second RAT (e.g., WLAN to cellular, cellular to WLAN, a first cellular type to a second cellular type (LTE to 3G or vice versa), etc.).

To initiate and complete an iRAT transition, the UE may perform various operations and participate in various signaling exchanges. For example, the UE may collect measurement data corresponding to a currently camped cell, collect measurement data corresponding to a neighbor cell, receive a request for measurement data, transmit a measurement report, participate in a cell reselection procedure, participate in a handoff procedure, participate in a signaling exchange associated with a registration procedure (e.g., a tracking area update (TAU), a routing area update (RAU), a location update (LU), etc.).

Under conventional circumstances, there may be scenarios in which the UE is subject to multiple iRAT transitions within a short time window (e.g., 30 seconds, 1 minutes, 3 minutes, 6 minutes, 10 minutes, 15 minutes, 30 minutes, 1 hour, 2 hours, etc.). This type of scenario may occur for any of a variety different factors corresponding to either the UE side or the network side. To provide a general example, if the UE is located on the edge of multiple coverage areas, fluctuating measurement data may cause multiple handovers and/or cell reselection procedures. As a result, the UE may ping pong between various networks, each corresponding to a different RAT. Due to the operations and signaling exchanges associated with performing a single iRAT transition, scenarios in which the UE is subject to multiple iRAT transitions causes the UE to experience a power drain on its limited power supply.

The exemplary embodiments describe various techniques for mitigating the negative effects associated with multiple iRAT transitions. These exemplary techniques may be used in conjunction with other currently implemented iRAT management techniques, future implementations of iRAT management techniques or independently from other iRAT management techniques.

Some exemplary techniques are described with regard to a high-power mode (HPM). The HPM may be used to prevent increased power usage by the UE and thus, use of the HPM allows for decreased power usage. As will be described in more detail below, the HPM may utilize a variety of different settings related to reducing cellular usage. For instance, in HPM, only certain mobile originating (MO) traffic may be permitted and certain mobile terminating (MT) traffic may be discarded. The additional power associated with the prohibited MO traffic and processing the discarded MT traffic may be conserved. The exemplary embodiments may utilize HPM to prevent excessive iRAT transitions and thus, achieve a longer battery life for the UE.

Figure 1:
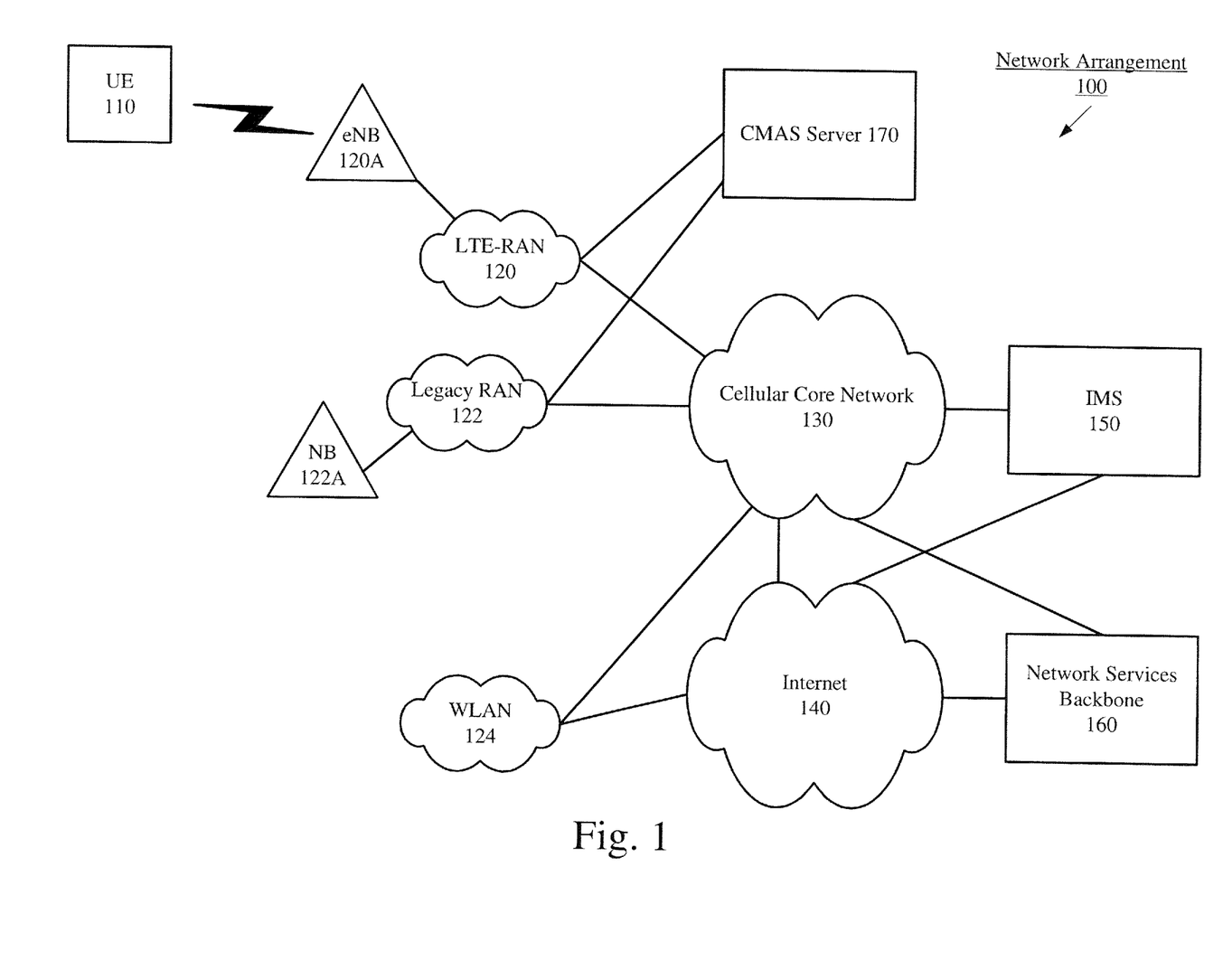
FIG. 1 shows an exemplary network arrangement according to various exemplary embodiments described herein.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

In the example of the network arrangement 100, the networks with which the UE 110 may wirelessly communicate with are an LTE radio access network (LTE-RAN) 120, a legacy radio access network (RAN) 122 and a wireless local access network (WLAN) 124. However, the UE 110 may also communicate with other types of networks (e.g., 5G new radio (NR), etc.) and the UE 110 may also communicate with networks over a wired connection. Therefore, the UE 110 may include an LTE chipset to communicate with the LTE-RAN 120, a legacy chipset to communicate with the legacy RAN 122 and a WLAN chipset to communicate with the WLAN 124.

Reference to a single legacy RAN is merely provided for illustrative purposes, the term legacy network is applicable to various type of RATs. For example, the legacy RAN 122 may represent a 3G WCDMA network or a 2G GSM network. Thus, in an actual network arrangement there may be multiple legacy RANs deployed within the vicinity of the UE 110.

The LTE-RAN 120 and the legacy RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, soft AP, IEEE 802.11 networks, etc.).

The UE 110 may connect to the LTE-RAN 120 via an evolved Node B (eNB) 120A. Those skilled in the art will understand that any association procedure may be performed for the UE 110 to connect to the LTE-RAN 120. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. More specifically, the UE 110 may associate with a specific cell (e.g., the eNB 120A of the LTE-RAN 120). As mentioned above, the use of the LTE-RAN 120 is for illustrative purposes and any type of network may be used. For example, the UE 110 may also connect to the legacy RAN 122 via the Node B (NB) 122A or a 5G NR RAN via a gNB (not pictured).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The network arrangement 100 may further include a Commercial Mobile Alert System (CMAS) server 170. The CMAS server 170 may generate emergency messages and/or emergency message indications (e.g., pings) to be broadcast over the cellular networks 120, 122, 124 to the UE 110. Since the CMAS messages are typically only broadcast over a cellular network, to comply with various regulations and/or standards the UE 110 may remain connected, in some manner, to a cellular network, even when the UE 110 has established a connection to a non-cellular network such as the WLAN 126. Thus, the CMAS server 170 may broadcast the emergency messages over the cellular networks 120, 122 and not the WLAN 124. As mentioned above, some exemplary techniques may utilize the HPM. In some embodiments, the select MT traffic configured to be processed in HPM may include indications of emergency messages distributed by the CMAS server 170.

Figure 2:
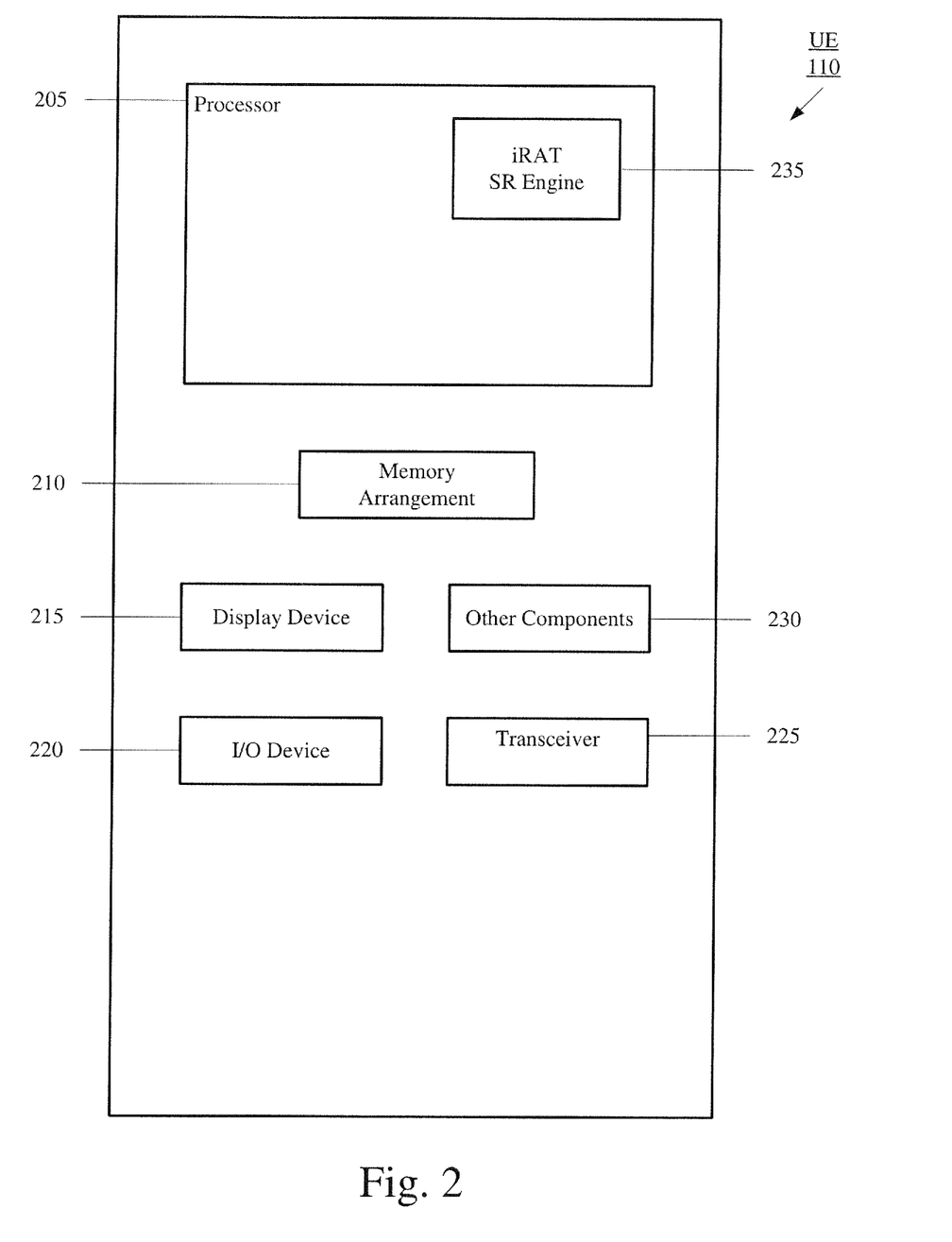
FIG. 2 shows an exemplary UE according to various exemplary embodiments described herein.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the engines may include an iRAT signaling reduction (SR) engine 235. The iRAT SR engine 235 may be configured to monitor for various predetermined conditions related to iRAT transitions. If a predetermined condition is identified, the iRAT SR engine 235 may implement a mechanism configured to limit the operations and/or signaling performed by the UE 110. This may prevent the UN 110 from being subject to excessive iRAT transitions and thus, the power that would be expended by the UN during the multiple iRAT transitions may be conserved.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the legacy RAN 122, the WLAN 124, etc. Accordingly, the transceiver 225 may operate on a variety of different frequencies or channels (e.g., set of consecutive frequencies).

Figure 3:
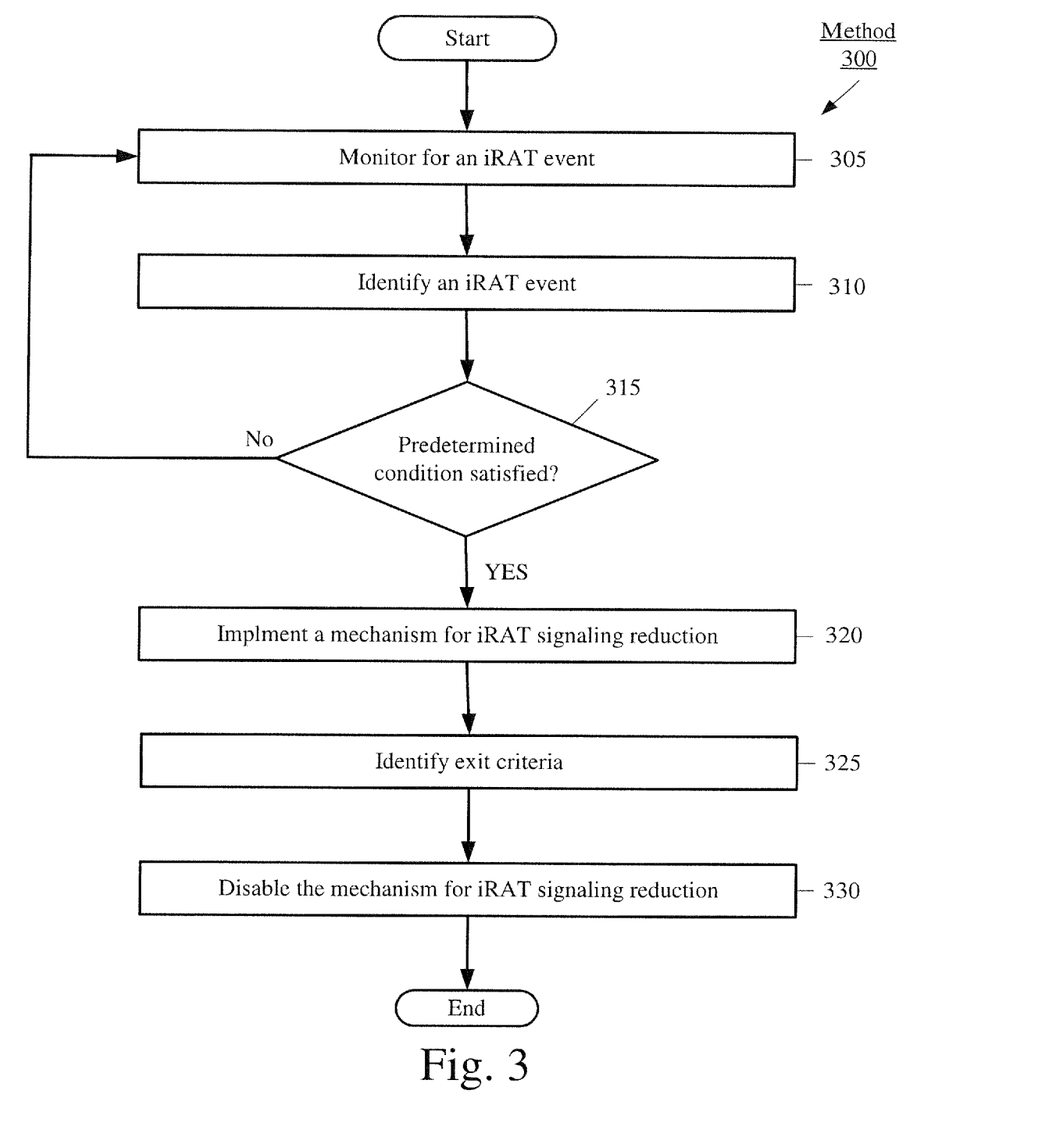
FIG. 3 shows a method for the UE to implement a mechanism for iRAT signaling reduction according to various exemplary embodiments.

FIG. 3 shows a method 300 for the UE 110 to implement a mechanism for iRAT signaling reduction according to various exemplary embodiments. The method 300 will be described with regard to the network arrangement 100 of FIG. 1 and the UE 110 of FIG. 2.

In 305, the UE 110 monitors for an iRAT event. Throughout this description, the term "iRAT event" refers to any type of iRAT transition or attempt at any type of iRAT transition. As will be described below, the UE 110 may activate a mechanism for iRAT signaling reduction based on identifying iRAT events.

In 310, the UE 110 identifies an iRAT event. To provide an example, types of iRAT events may include but are not limited to, a successful handover of the UE 110 from a cell corresponding to a RAT to another cell corresponding to a different RAT, an unsuccessful handover attempt of the UE 110 in which the camped cell and the target cell correspond to different RATs, a successful cell reselection procedure that results in the UE 110 camping on a cell corresponding to a RAT that is different than the RAT of the previously camped cell, an unsuccessful cell reselection procedure in which the camped cell and the target cell correspond to different RATs, a scenario in which the UE 110 experiences an out of service (OOS) event with a currently camped cell corresponding to a RAT and subsequently camps on another cell corresponding to a different RAT, etc. The above examples are only provided for illustrative purposes and are not intended to limit the exemplary embodiments in any way. Those skilled in the art will understand that an iRAT event may represent any scenario in which the UE 110 switches, or attempts to switch, from camping on a cell corresponding to a first RAT to camping on another cell corresponding to a different second RAT.

To provide an example of an iRAT event within the context of the network arrangement 100, consider the following exemplary scenario. Initially, the UE 110 is camped on the NB 122A of the legacy RAN 122. When camped, the UE 110 collects measurement data corresponding to the currently camped cell (e.g., NB 122A) and/or at least one neighbor cell (e.g., eNB 122A). In response to a request from the network and/or the measurement data collected by the UE 110, the UE 110 may be triggered to provide a measurement report to the currently camped cell. Subsequently, one or more network components (e.g., the core network 130, the legacy RAN 122, the NB 122A, the LTE-RAN 120, the eNB 122A, etc.) may initiate a handover of the UE 110 from the NB 122A to the eNB 120A based, at least in part, on the measurement report provided by the UE 110. Next, the UE 110 may synchronize with the eNB 120A and participate in registration procedures (e.g., tracking area update (TAU), etc.). Subsequently, the UE 110 may access network services from the LTE-RAN 120 via the eNB 120A. The exemplary embodiments relate to preventing the UE 110 from experiencing situations similar to the above exemplary scenario multiple times within a short time window (e.g., 30 seconds, 1 minutes, 3 minutes, 6 minutes, 10 minutes, 15 minutes, 30 minutes, 1 hour, 2 hours, etc.). The above example is not intended to limit the exemplary embodiments in any way and is only intended to provide a general example of the operations and signaling exchanges that may occur during an iRAT transition. Those skilled in the art would understand that a handover and other types of iRAT transitions may include various operations performed on the UE 110 side and the network side. The exemplary embodiments are applicable to any type of iRAT transition or attempt at any type of iRAT transition.

In 315, the UE 110 determines whether a predetermined condition is satisfied. The predetermined condition may indicate to the UE 110 that excessive iRAT transitions are likely to occur. For example, if the UE 110 identifies multiple iRAT events within a short time window, the UE 110 may assume that further iRAT events are likely to occur. Thus, in some embodiments, the predetermined condition may be based on a predetermined number of iRAT events within a predetermined duration. However, the exemplary embodiments are not limited to a predetermined condition based on these factors. Other exemplary factors may include, but are not limited to, information provided by the network indicating that excessive iRAT signaling may be likely at a particular geographical location or under a certain set of cellular conditions, information collected by the UE 110 indicating that excessive iRAT signaling may be likely at a particular geographical location or under a certain set of cellular conditions, a number of failed iRAT transitions, measurement data, apriori database based on events reported by similar UEs that indicates the likelihood of an iRAT transition based on geo-location, time, etc.

During operation, the UE 110 (e.g., the iRAT SR engine 235) may utilize any appropriate technique to track the number of iRAT events that have occurred within a particular duration. For example, when an iRAT event is identified, the UE 110 may initiate a timer and set a counter to indicate a first iRAT event. If another iRAT event is identified while the timer is running, the counter may be set to indicate that a second iRAT event has occurred. If a further iRAT event is identified while the timer is running, the counter may be set to indicate that a third iRAT event has occurred. If the timer expires before a predetermined number of iRAT events are identified the counter may be cleared. However, reference to a timer and counter is merely for illustrative purposes other techniques may utilize time stamps, bit flags or any other appropriate mechanism.

In some embodiments, the UE 110 may exclude iRAT transitions related to circuit switched fall back (CSFB) from being considered an iRAT event. Those skilled in the art would understand that CSFB is part of the LTE protocol and may be used to deliver voice and short-message-service (SMS) using a circuit switch network (e.g., 3G or 2G legacy networks). By excluding iRAT transitions related to CSFB from being considered an iRAT event, the UE 110 may ensure that sending and/or receiving voice calls and SMS does not trigger an iRAT signaling reduction mechanism. Reference to a CSFB event is for illustrative purposes and the UE 110 may exclude iRAT transitions related to other similar events.

If the predetermined condition is not satisfied in 315, the method 300 returns to 305 where the UE 110 continues to monitor for iRAT events. If the predetermined condition is satisfied, the method 300 continues to 320. In 320, the UE 110 implements a mechanism for iRAT signaling reduction. As will be described below, the UE 110 may implement any of a variety of different mechanisms. Each mechanism aims to prevent excessive iRAT transitions.

One exemplary iRAT signaling reduction mechanism relates to excluding iRAT neighbor cell measurements from being a factor in an operation related to iRAT transitions. By excluding iRAT neighbor cell measurements, the UE 110 may prevent triggering an iRAT transition. For example, the UE 110 may be provided with a neighbor cell list that identifies one or more cells and their corresponding RAT. In another example, the UE 110 may determine the RAT corresponding to a neighbor cell based on information broadcast by the neighbor cell or another network component. If the RAT corresponding to the neighbor cell is different than the RAT of the currently camped cell, the UE 110 may omit measurement data corresponding to the iRAT neighbor cell from any of a variety of different operations. This may include, but is not limited to, not collecting measurement data corresponding to the iRAT neighbor cells, excluding measurement data corresponding to the iRAT neighbor cells from being included in a measurement report, excluding the measurement data corresponding to the iRAT neighbor cells from being considered as a factor in a procedure that may cause an iRAT transition, etc. Since the iRAT neighbor cell measurements are omitted, the measurement data corresponding to an iRAT neighbor cell may not trigger an iRAT transition. Those skilled in the art will understand that iRAT neighbor cell measurements may occur in either an idle state or a connected state. The exemplary iRAT signaling reduction may be applicable to both idle state and connected state operations.

Another exemplary iRAT signaling reduction mechanism relates to a RAT lock. The RAT lock may prevent the UE 110 from performing signaling related to certain RATs. For example, the UE 110 may set the RAT lock to a selected RAT (e.g., LTE, WCDMA, etc.) and signaling, such as radio resource control (RRC) signaling, corresponding to the other RATs may not be performed by the UE 110. In some embodiments, the UE 110 may set the RAT lock to the RAT corresponding to the currently camped cell. Thus, the UE 110 may avoid a reselection procedure to a different RAT. In other embodiments, the RAT lock may correspond to the last camped RAT. Thus, in response to an OOS event, the UE 110 may lock to the last camped RAT and avoid an iRAT transition.

In some embodiments, the UE 110 may not indicate the use of the RAT lock to the network so that RAT lock related signaling may be avoided. Since the RAT lock is local to the UE 110 and not known on the network side, iRAT activity may still be triggered by the network. Thus, when the RAT lock is active, the UE 110 may suppress iRAT activity that is triggered by the network.

Another exemplary mechanism relates to disabling voice over a packet-switched network (VoPS). For example, the UE 110 may disable voice over LTE (VoLTE). In some scenarios, this may allow the UE 110 to utilize the LTE-RAN 120 for data services and CSFB for voice. In other scenarios, this may allow for the UE 110 to utilize the legacy RAN 120 and avoid an iRAT transition for VoPS purposes. By disabling VoPS, the UE 110 may save power by avoiding performing IMS registration and deregistration procedures.

Another exemplary iRAT signaling reduction mechanism relates to implementing a reselection bias. Implementing the reselection bias may include modifying one or more parameters used by the UE 110 in accordance with iRAT cell reselection procedures. By modifying the reselection parameters, the UE 110 may avoid an iRAT transition. For example, when the UE 110 is camped on the eNB 120A of the LTE-RAN 120, implementing the reselection bias may allow the UE 110 to avoid an iRAT transition to the legacy RAN 122.

A system information block (SIB) may provide information relevant to iRAT cell reselection. For example, in the context of an LTE RAT, SIB 6 is configured to include information relevant to iRAT cell reselection. This information may include reselection parameters such as thresholds that may trigger the UE 110 and/or the network to initiate a cell reselection procedure. Implementing the reselection bias may include modifying parameters such as, but not limited to, QrxLevMin, threshXlowP and threshXlowQ. However, reference to SIB 6 is merely provided for illustrative purposes, different RATs may refer to a similar component by a different name.

QrxLevMin may represent the minimum received power level for the serving cell. If the UE 110 collects measurement data (e.g., reference signal received power (RSRP)) that goes below QrxLevMin, cell reselection may be triggered. To make cell reselection less likely, the UE 110 may reduce QrxLevMin by an offset.

ThreshXlowP may represent the threshold of a target cell to trigger cell reselection from a high priority to a low priority cell. If the UE 110 collects measurement data (e.g., RSRP) that is above threshXlowP, cell reselection to the corresponding target cell may be triggered. To make cell reselection less likely, the UE 110 may increase threshXlowP.

ThreshXlowQ may represent the threshold of a target cell to trigger cell reselection from a high priority to a low priority cell. If the UE 110 collects measurement data (e.g., reference signal received quality (RSRQ)) that is above threshXlowQ, cell reselection to the corresponding target cell may be triggered. To make cell reselection less likely, the UE 110 may increase threshXlowQ.

In some embodiments, the UE 110 may also omit collecting, monitoring, evaluating and/or reporting measurement data corresponding to frequency channels associated with legacy RANs. For example, the Universal Mobile Telecommunication System (UMTS) Terrestrial Radio Access (UTRA) is part of the 3G protocol. UTRA absolute frequency channel number (UARFCN) is a unique number that radio channels within the frequency bands used by UTRA UMTS. Thus, by omitting collecting, monitoring, evaluating and/or reporting measurement data corresponding to UARFCN the UE 110 may avoid cell reselection to a legacy RAN.

The above examples are merely provided for illustrative purposes and are not intended to limit the exemplary embodiments in any way. Different entities may refer to similar parameters by a different name. The exemplary embodiments may implement the iRAT cell reselection bias in any appropriate manner.

Another exemplary iRAT signaling reduction mechanism relates to utilizing HPM. As mentioned above, HPM may be used to prevent an increased amount of power from being used by the UE and thus, use of HPM decreases power usage. The exemplary embodiments may utilize HPM to prevent excessive iRAT signaling and thus, achieve a longer battery life for the UE.

HPM may utilize a variety of different settings related to reducing cellular usage. In some embodiments, HPM may include placing the baseband processor in CMAS mode. CMAS mode is a power efficient mode of operation where the UE 110 may limit various operations including but not limited to the processing of non-critical/background data traffic and the processing of foreground/user initiated traffic. For example, incoming data may be analyzed, and only emergency related data may be used for subsequent processing while non-emergency related data may be ignored or buffered for later use. Thus, in CMAS mode, signaling exchanges over the network connection related to emergency data may be enabled and other types of data may be ignored or remain unprocessed.

HPM may also include a setting in which discretionary traffic may be permitted. Discretionary traffic may represent background traffic that is exchanged without any user intervention or user input (e.g., non-critical/background). HPM may also include a setting in which user-initiated traffic is permitted (e.g., foreground). HPM may also include a setting in which traffic generated by the operating system or by applications running on the UE 110 may be prohibited (e.g., buffered for later use, discarded, etc.). This type of traffic may occur in response to an iRAT transition. By restricting this type of traffic, iRAT signaling reduction may be achieved. Accordingly, when in HPM, one or more types of traffic may be permitted. The other types of traffic may be ignored, buffered for later use, discarded, etc. In some embodiments, there may be a default setting for the type of permitted traffic in HPM. In other embodiments, the type of traffic that may be permitted in HPM may be dynamically selected based on any appropriate factors. In further embodiments, an iRAT transition signaling reduction mechanism may include restricting select types of traffic without entering HPM.

Each exemplary iRAT signaling reduction mechanism may correspond to its own predetermined condition. For example, the UE 110 may disable VoPS if (x) iRAT transitions occur within a z time window, the reselection bias may be applied if (x+2) iRAT transitions occur within z time window and HPM may be activated if (x+5) iRAT transitions occur within the z time window. Accordingly, in some embodiments, the iRAT signaling reduction mechanisms may be implemented in steps. Continuing with the above example, if the predetermined condition corresponding to disabling VoPS is triggered, the UE 110 may activate this mechanism. If iRAT transitions persist despite disabling VoPS and the predetermined condition corresponding to reselection bias is triggered, the UE 110 may implement the reselection bias mechanism. If iRAT transitions persist despite utilizing the reselection bias mechanism and the predetermined condition corresponding to HPM is triggered, the UE 110 may then activate HPM. The above example is merely provided for illustrative purposes and is not intended to limit the exemplary embodiments in any way. The exemplary iRAT signaling reduction mechanisms may be triggered using any appropriate one or more factors.

In 325, the UE 110 identifies exit criteria. In some embodiments, the exit criteria may be based on time. For example, when the UE 110 activates an iRAT signaling reduction mechanism, the UE 110 may initiate a timer and when the timer expires (e.g., 2 minutes, 3 minutes, 5 minutes, 15, minutes, 30 minutes, etc.) the iRAT signaling reduction mechanism may be disabled.

In some embodiments, the exit criteria for HPM may include an indication that a type of MO traffic is to be transmitted or cellular conditions have improved. For example, the UE 110 may exit HPM when the applications processor triggers an event for a high priority app/traffic class. In another example, the UE 110 may exit HPM if the UE 110 identifies an improvement corresponding to the cellular conditions of the LTE-RAN 120 within a predetermined duration of entering HPM (e.g., 1 second, 2 seconds, 5 seconds, 10 seconds, etc.). In a further example, the UE 110 may exit HPM if the UE 110 identifies an improvement corresponding to the cellular conditions of the legacy RAN 122 within a predetermined duration of entering HPM (e.g., 5 seconds, 10 seconds, 15 seconds, etc.).

As indicated above, the exemplary iRAT signaling reduction mechanisms may limit the expected functionality of the UE 110. Accordingly, the exit criteria may further include any indication that a currently implemented iRAT signaling reduction mechanism is having a negative impact on the user experience. The above examples of exit criteria are not intended to limit the exemplary embodiments in any way. The exemplary embodiments may apply to any appropriate exit criteria.

As mentioned above, in some embodiments multiple iRAT transition signaling reductions mechanisms may each corresponding to a different predetermined condition and thus, may be implemented in steps. Similarly, in some embodiments, each exemplary iRAT signaling reduction mechanism may correspond to its own exit criteria. Therefore, the iRAT transition signaling reductions mechanisms may also be deactivated in steps. To provide an example, consider a scenario in which both the reselection bias mechanism and the HPM mechanism are active at the same time. Next, exit criteria may be triggered for HPM. Thus, HPM may be deactivated while the cell reselection bias mechanism continues to be utilized by the UE 110. However, this example is merely provided for illustrative purposes and is not intended to limit the exemplary embodiments in any way. Regardless of how the multiple iRAT transition signaling reduction mechanisms may be implemented, the multiple iRAT transition signaling reduction mechanisms may be deactivated in any order, at any time and based on any appropriate exit criteria.

In 330, the UN 110 disables the mechanism for iRAT signaling reduction based on identifying the exit criteria. Subsequently, the method 300 ends.

In some embodiments, the UE 110 may implement a budget for HPM. The budget may relate to a time duration in which the UE 110 is permitted to operate in HPM (e.g., 3 minutes, 5 minutes, 10 minutes, 20 minutes, 30 minutes, 90 minutes, etc.) during a predetermined time window (e.g., 15 minutes, 30 minutes, 1 hour, 2 hours, 5 hours, etc.). To provide an example, consider the following exemplary scenario in which the HPM budget is configured to permit the UE 110 to operate in HPM for (n) minutes within (y) time window.

Initially, the predetermined condition to enter HPM is identified (e.g., (x) iRAT events in (z) minutes) and HPM is triggered. When the UE 110 initiates HPM, the (y) time window begins. The UE 110 tracks the time duration that the UE 110 is operating in HPM for iRAT signaling reduction purposes. Subsequently, exit criteria are identified and HPM is disabled.

If the UE 110 was operating in HPM for greater than or equal to n minutes, the UE 110 may not enter HPM until the y time window expires. If the UE 110 was operating in HPM for less than n minutes, the UE 110 may enter HPM for iRAT signaling reduction if the corresponding predetermined condition is triggered a second time within the y time window. After a second instance in which HPM is utilized within the y time window, the UE 110 determines whether the total duration of operating in HPM during the first instance and the second instance is greater than or equal to n minutes. If the total duration is greater than or equal to n minutes, the UE 110 may not enter HPM for a third time until the hour time window expires. If the total duration is less than n minutes, the UE 110 may enter HPM for iRAT signaling reduction a third time if the corresponding predetermined condition is triggered within the y time window. When the y time window expires, the HPM budget resets.

The above example was described with regard to the UE 110 operating in HPM for greater than or equal to the configured time parameter (e.g., n minutes). However, in some embodiments, the time parameter may be considered exit criteria. Thus, once the total duration of the UE 110 being in HPM is reached within the predetermined time window (e.g., y), the UE 110 may exit HPM and not enter HPM again until the predetermined time window expires. However, the above referenced HPM budget time parameters are merely provided for illustrative purposes. The exemplary embodiments may apply to a HPM that utilizes any particular time parameters.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE):
      tracking a plurality of inter-radio access technology (iRAT) events experienced by the UE during a predetermined time window using a counter, wherein the plurality of iRAT events include iRAT transitions and iRAT transition attempts and exclude circuit switched fall backs (CSFBs);
      identifying that a first predetermined condition is satisfied, wherein the first predetermined condition is based on identifying a predetermined number of iRAT events within the predetermined time window; and
      implementing a first mechanism for iRAT signaling reduction based on the first predetermined condition.

2. The method of claim 1, wherein the first mechanism for iRAT signaling reduction includes modifying one or more parameters associated with iRAT cell reselection or iRAT cell selection.

3. The method of claim 1, wherein the first mechanism for iRAT signaling reduction includes omitting one or more iRAT neighbor cells from a measurement report that is to be provided to the network.

4. The method of claim 1, wherein the first mechanism for iRAT signaling reduction includes utilizing a RAT lock corresponding to a currently camped RAT or a previously camped RAT.

5. The method of claim 1, wherein the first mechanism includes disabling voice over packet switched (VoPS).

6. The method of claim 1, wherein the first mechanism includes restricting select types of mobile originating (MO) traffic or mobile terminating (MT) traffic.

7. The method of claim 6, further comprising:
   identifying exit criteria corresponding to the first mechanism for iRAT signaling reduction; and
   deactivating the first mechanism based on identifying the exit criteria, wherein the exit criteria includes an improvement of cellular conditions within a predetermined duration relative to implementing the first mechanism.

8. The method of claim 6, wherein the UE restricts the use of the first mechanism based on a first time parameter corresponding to a predetermined duration relative to implementing the first mechanism at a first time and a second time parameter corresponding to a total duration of utilizing the first mechanism within the predetermined duration.

9. The method of claim 1, wherein an iRAT event includes any type of iRAT transition except for an iRAT transition related to circuit switched fallback (CSFB).

10. The method of claim 1, further comprising:
determining that a second predetermined condition is satisfied, wherein the second predetermined condition is based on identifying a further predetermined number of iRAT events within the predetermined time window;
implementing a second mechanism for iRAT signaling reduction, wherein the first mechanism and the second mechanism are active at the same time.

11. The method of claim 10, wherein the first mechanism includes to modifying one or more parameters associated with iRAT cell reselection and the second mechanism restricting select types of mobile originating (MO) traffic or mobile terminating (MT) traffic.

12. A user equipment (UE), comprising:
a transceiver configured to communicate with multiple types of networks; and
a processor configured to perform operations, the operations comprising:
tracking a plurality of inter-radio access technology (iRAT) events experienced by the UE during a predetermined dine window using a counter, wherein the plurality of iRAT events include iRAT transitions and iRAT transition attempts and exclude circuit switched fall backs (CSFBs);
identifying that a first predetermined condition is satisfied, wherein the first predetermined condition is based on identifying a predetermined number of iRAT events within the predetermined time window; and
implementing a first mechanism for iRAT signaling reduction based on the first predetermined condition.

13. The UE of claim 12, wherein the first mechanism for iRAT signaling reduction includes one of i) modifying one or more parameters associated with iRAT cell reselection, ii) omitting one or more iRAT neighbor cells from a measurement report that is to be provided to the network, iii) utilizing a RAT lock corresponding to a currently camped RAT or a previously camped RAT and iv) disabling voice over packet switched (VoPS).

14. The UE of claim 12, wherein the first mechanism includes restricting select types of mobile originating (MO) traffic and mobile terminating (MT) traffic.

15. The UE of claim 14, further comprising:
identifying exit criteria corresponding to the first mechanism for iRAT signaling reduction; and
deactivating the first mechanism based on identifying the exit criteria.

16. The UE of claim 15, wherein the exit criteria includes an improvement of cellular conditions within a predetermined duration relative to implementing the first mechanism.

17. The UE of claim 14, wherein the UE restricts the use of the first mechanism based on a first time parameter corresponding to a predetermined duration relative to implementing the first mechanism at a first time and a second time parameter corresponding to a total duration of utilizing the first mechanism within the predetermined duration.

18. The UE of claim 14, wherein the UE restricts the use of the first mechanism based on a first time parameter corresponding to a predetermined duration relative to implementing the first mechanism at a first time and a second time parameter corresponding to a total duration of utilizing the first mechanism within the predetermined duration.

19. The UE of claim 12, further comprising:
determining that a second predetermined condition is satisfied, wherein the second predetermined condition is based on identifying a further predetermined number of iRAT events within the predetermined time window;
implementing a second mechanism for iRAT signaling reduction, wherein the first mechanism and the second mechanism are active at the same time.

20. An integrated circuit, comprising:
circuitry configured to tracki a plurality of inter-radio access technology (iRAT) events experienced by a user equipment (UE) during a predetermined time window using a counter, wherein the plurality of iRAT events include iRAT transitions and iRAT transition attempts and exclude circuit switched fall hacks (CSFBs);
circuitry configured to identify that a first predetermined condition is satisfied, wherein the first predetermined condition is based on identifying a predetermined number of iRAT events within the predetermined time window; and
circuitry configured to implement a first mechanism for iRAT signaling reduction based on the first predetermined condition.

21. The integrated circuit of claim 20, wherein the first mechanism for iRAT signaling reduction includes one of (i) modifying one or more parameters associated with iRAT cell reselection or iRAT cell selection (ii) omitting one or more iRAT neighbor cells from a measurement report that is to he provided to the network, (iii) utilizing a RAT lock corresponding to a currently camped RAT or a previously camped RAT, (iv) disabling voice over packet switched (VoPS) or (v) restricting select types of mobile originating (MO) traffic or mobile terminating (MT) traffic.

22. The integrated circuit of claim 20, further comprising:
circuitry configured to identify exit criteria corresponding to the first mechanism for iRAT signaling reduction; and
circuitry configured to deactivate the first mechanism based on identifying the exit criteria, wherein the exit criteria includes an improvement of cellular conditions within a predetermined duration relative to implementing the first mechanism.

\* \* \* \* \*

UNITED STATES PATENT AND TRADEMARK OFFICE
CERTIFICATE OF CORRECTION

| | |
|---|---|
| PATENT NO. | : 11,477,711 B2 |
| APPLICATION NO. | : 16/796453 |
| DATED | : October 18, 2022 |
| INVENTOR(S) | : Dhanapal et al. |

It is certified that error appears in the above-identified patent and that said Letters Patent is hereby corrected as shown below:

In the Claims

Claim 20, Column 14, Line 26:
"circuitry configured to tracki a plurality of inter-radio" should read "circuitry configured to track a plurality of inter-radio".

Claim 21, Column 14, Line 44:
"iRAT neighbor cells from a measurement report that is to he" should read "iRAT neighbor cells from a measurement report that is to be".

Signed and Sealed this
Thirteenth Day of December, 2022

Katherine Kelly Vidal
*Director of the United States Patent and Trademark Office*